(No Model.)  4 Sheets—Sheet 1.

H. AIKEN.
HYDRAULIC MOTOR.

No. 502,844. Patented Aug. 8, 1893.

WITNESSES
Thomas W. Bakewell
H. M. Corwin

INVENTOR
Henry Aiken (No Model.)

H. AIKEN.
HYDRAULIC MOTOR.

No. 502,844.

Patented Aug. 8, 1893.

4 Sheets—Sheet 2.

WITNESSES
Thomas W. Bakewell
H. M. Corwin

INVENTOR
Henry Aiken (No Model.)  4 Sheets—Sheet 3.

H. AIKEN.
HYDRAULIC MOTOR.

No. 502,844.  Patented Aug. 8, 1893.

WITNESSES
Thomas W. Bakewell
H. M. Corwin

INVENTOR
Henry Aiken (No Model.)

H. AIKEN.
HYDRAULIC MOTOR.

No. 502,844.

4 Sheets—Sheet 4.

Patented Aug. 8, 1893.

WITNESSES
J. W. Bakewell
A. M. Corwin

INVENTOR
Henry Aiken

UNITED STATES PATENT OFFICE.

HENRY AIKEN, OF PITTSBURG, PENNSYLVANIA.

HYDRAULIC MOTOR.

SPECIFICATION forming part of Letters Patent No. 502,814, dated August 8, 1893.

Application filed April 28, 1892. Serial No. 431,052. (No model.)

*To all whom it may concern:*

Be it known that I, HENRY AIKEN, of Pittsburg, in the county of Allegheny and State of Pennsylvania, have invented a new and useful Improvement in Hydraulic Motors, of which the following is a full, clear, and exact description, reference being had to the accompanying drawings, forming part of this specification, in which—

Figure 1:
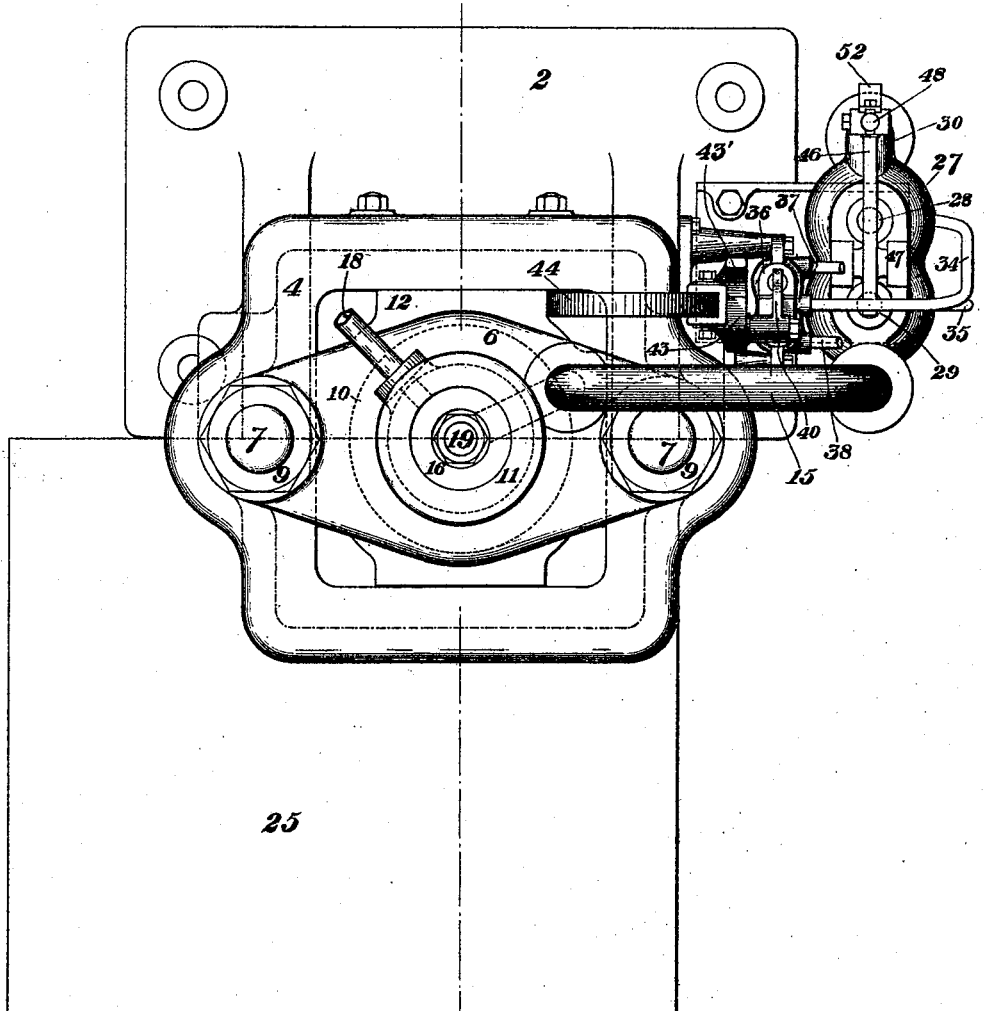
Figure 2:
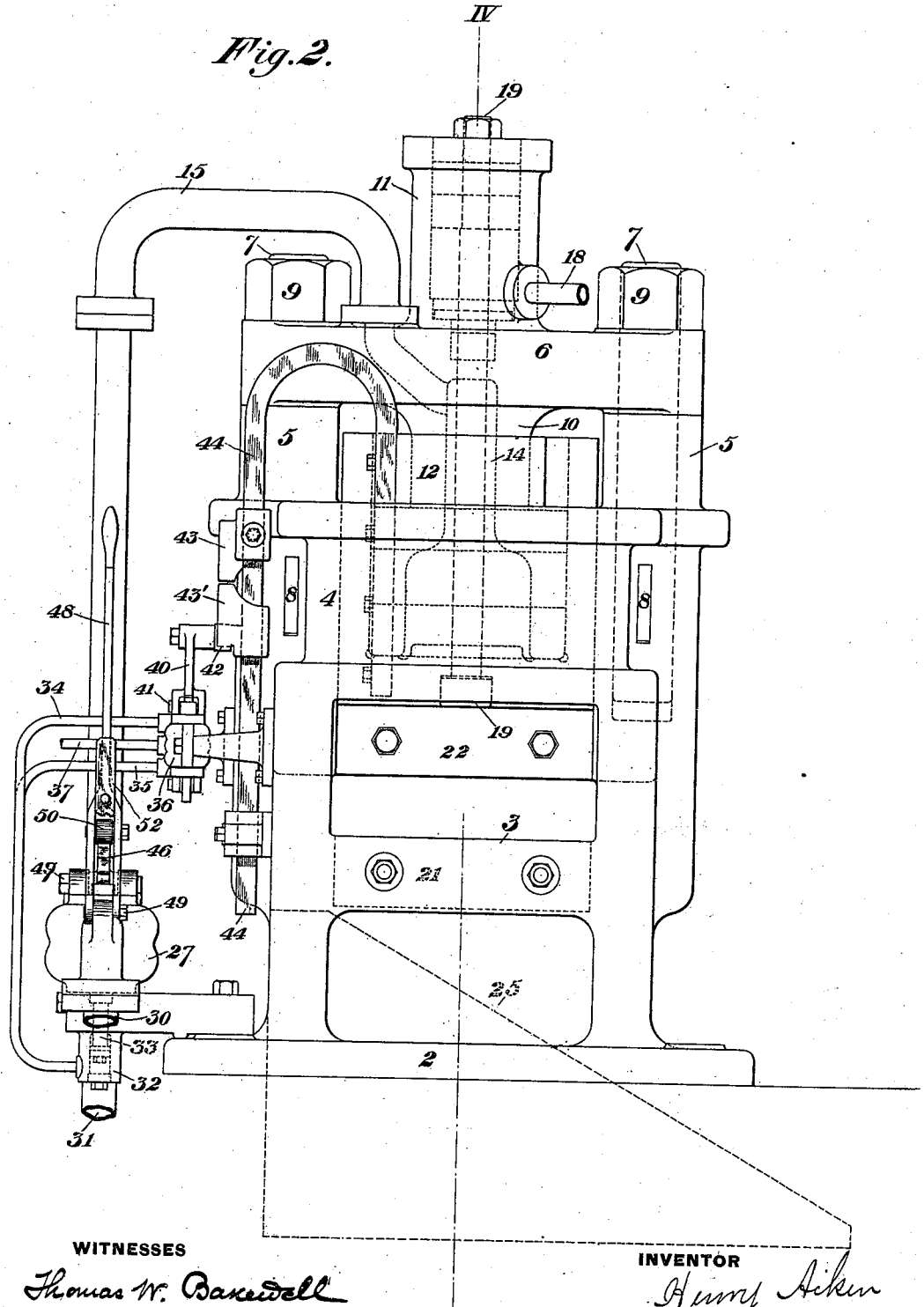
Figure 3:
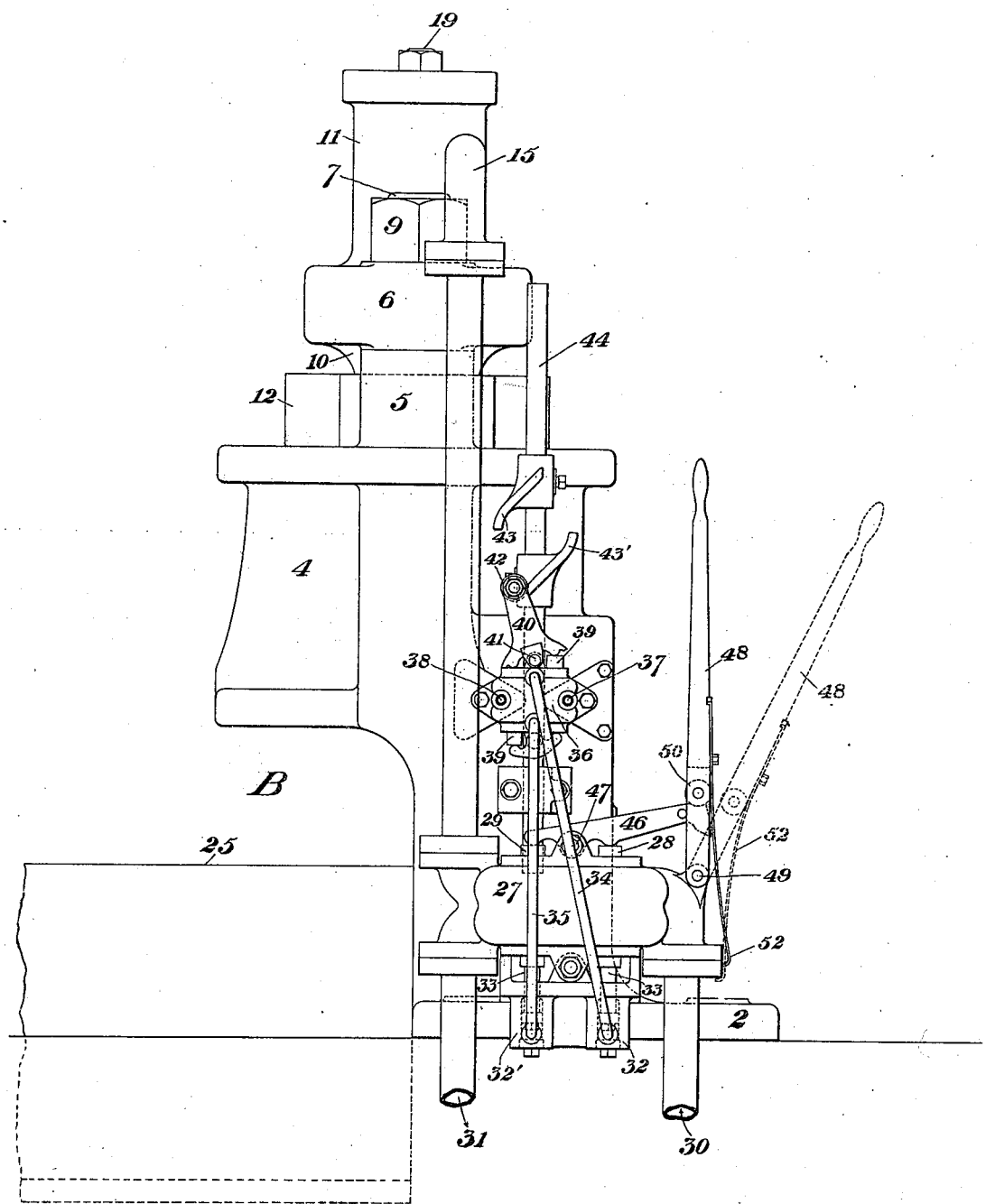
Figure 4:
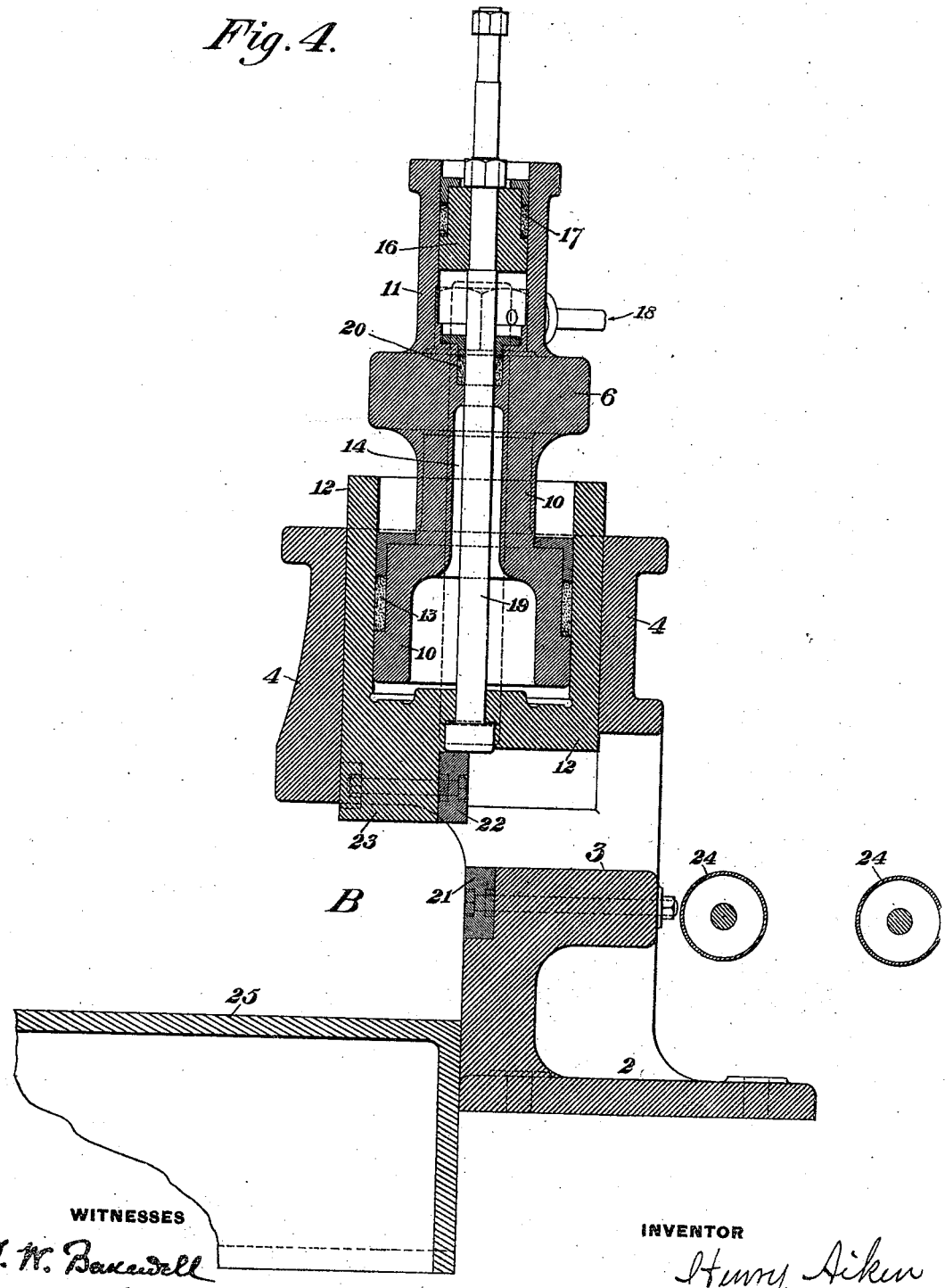

Figure 1 is a plan view of my improved shears, showing the same in connection with a part of the conveying mechanism for carrying off the billets cut by the shears. Fig. 2 is a front elevation of the shears. Fig. 3 is a side elevation of the same; and Fig. 4 is a vertical section of the shears on the line IV—IV of Fig. 1.

Like symbols of reference indicate like parts in each of the figures.

My invention relates to improved valve mechanism designed for use with shears and other hydraulic apparatus. I show and describe this improved mechanism as applied to shears of novel construction, which I do not claim specifically herein, since I have made the same the subject of a separate patent application, Serial No. 441,476, filed July 28, 1892.

In the drawings I show the frame of the shears made in two parts. This is the preferable construction, although my invention is not limited thereto.

The lower part of the shear-frame comprises a base 2, and an anvil-block 3 for carrying the lower knife. 4 is a hollow vertical guide portion which contains the moving actuating cylinder and has upright posts 5 projecting above the same.

The second piece of the shear-frame comprises an entablature 6, set horizontally on the posts 5, and held thereto by vertical bolts 7, which pass into the lower part of the frame, and are held near their lower ends by keys 8, and at their upper ends by nuts 9. The arrangement and mode of fastening these bolts may be modified in various ways.

10 is a stationary plunger which projects downwardly from the entablature 6, and is preferably made integral therewith and surmounting the entablature and preferably made integral therewith, is a cylinder 11, designed to serve the function of a counterbalancing device as hereinafter described.

12 is a moving cylinder which is set around the plunger 10 and within the guide portion 4, the plunger being provided with suitable packing 13. The stem of the plunger is made hollow, so as to afford a water passage 14, which leads to the cylinder and to which water is supplied by means of a supply-pipe 15, which extends from the controlling valve hereinafter described. The counterbalancing cylinder 11 is provided with a movable plunger 16, having packing 17, and actuated by water supplied through a pipe 18. This plunger is connected with the cylinder 12 by a vertical rod 19, which extends from the plunger 16 down through the hollow plunger 10 and is attached to the cylinder as shown in Fig. 4.

20 is a stuffing-box which is set between the cylinder 11 and the hollow passage of the plunger 10, in order to prevent leakage of water from one to the other around the rod 19.

Within the scope of the claims of my application the main cylinder and piston may be reversed, the cylinder being made stationary and the piston made to be movable.

In the operation of the shears I prefer that the water pressure should be constantly exerted in the cylinder 11, which is of small sectional area and thus serves as a constantly acting counterbalance for the cylinder 12. The anvil-block 3 of the shear-frame does not extend entirely across to the back of the shears, but terminates at a middle point, affording under the rear half of the cylinder a gap B open at one or both sides. The stationary knife-blade 21 is secured to a seat on the anvil-block at the rear edge of the latter, and the moving-knife 22 is secured to the middle portion of the cylinder, so that its cutting edge shall be directly opposite the cutting edge of the knife 21, and shall be adapted to operate in conjunction therewith.

For the purpose of affording means for attaching the moving knife to the cylinder, I provide the latter with a downwardly projecting portion 23, through which the securing bolts pass. The knife-blades are set in a vertical plane coincident with or substantially parallel with the plane of the frame of the shears, which is the plane of the main vertical bolts above described. Feed-rollers 24 are preferably placed at the front of the shears in order to convey the metal thereto, and at the rear of the shears extending laterally from the gap B, is an inclined chute 25 for carrying off the metal pieces or billets as they are cut. At the base of this chute is a conveying table provided with suitable moving mechanism which carries off to the desired place the metal pieces as they drop thereon from the chute.

The operation of the parts of the shears above described is as follows:—The metal to be cut is fed to the shears by means of the feed-rollers 24, so that it shall rest on the anvil-block 3 and on the bed-knife 21. Water is then admitted into the cavity 14 of the plunger and acting on the cylinder 12 depresses the same, causing the moving knife 22 to engage the metal and to shear it off against the knife 21. The metal billet or piece thus cut by the knives drops upon the inclined chute 25, and descending the same laterally passes to the conveying table by which it is removed to the desired point. To elevate the moving knife the controlling valve is manipulated so as to cut off the connection of the water passage 14 with the source of supply and to put it into communication with the exhaust; whereupon, the counterbalancing cylinder and plunger elevate the cylinder 12 and displace the water therefrom.

The construction of the shear-frame above described by which a laterally open gap is afforded for the automatic removal of the metal as it is cut, will be recognized by those familiar with the art as of very great advantage.

I shall now describe the valve mechanism which I have devised for the purpose of rendering the shears automatic in their action, premising that the claims relating thereto are not limited to the special construction of the shears above described, and that the valve mechanism may be used with shears differently constructed. The main water supply pipe 15 of the shears extends from a three-way valve 27, which may be otherwise constructed in the manner shown and described in my prior patent, No. 465,232, dated December 15, 1891, said valve being provided with two pistons 28 and 29, adapted to be moved so as to put the pipe 15 into communication with a main-supply pipe 30, or with an exhaust pipe 31, or to cut it off from communication with both. To operate the piston valves 28 and 29 of the three-way valve 27, I employ small single acting auxiliary cylinders 32 32', having pistons 33 which project and are adapted to engage the ends of the piston valves, and to operate these cylinders I employ water-supply pipes 34, 35, which extend from the ports of an auxiliary four-way valve 36. This valve may also be constructed as shown in my patent, as supply and exhaust pipes 37, 38 and two piston-valves 39, are adapted to move in opposite directions and to assume one of two positions as desired, so as to connect either one of pipes 34, 35, with the supply and the other with the exhaust. To operate the piston-valves of the valve 36, I may employ a suitable hand-lever, but to work them automatically I use a rock-lever 40 pivoted at 41 and having a projecting arm, (which may be provided with a laterally projecting anti-friction roller 42) adapted to be engaged by projections or tappets 43, 43', on a rod 44, which is connected to and moves with the shear-actuating cylinder 12. In the drawings I show the rod 44 reflexed and connected directly to the cylinder 12, but, if desired, it may extend upwardly and be connected with a rod moving with said cylinder. For locking the piston-valves of the valve 27, I employ a rocking-lever 46, pivoted at 47 and provided at opposite sides of its pivot with projections which engage the ends of the piston-valves 28 and 29, respectively. The outer portion of this lever 46 passes through a slot or yoke in a hand-lever 48, which is oscillatory in a pivot 49, and may be provided with an anti-friction roller 50, adapted to bear on the outer side of the lever 46 when the parts are in locked position. In Fig. 3 I show the valve 27 in locked position, the lever 46 being held by the hand-lever 48, so as to prevent longitudinal motion of the piston-valves, by action of the auxiliary cylinder 32, the water pressure being preferably continuously exerted in one of these auxiliary cylinders. The shear-cylinder is then elevated. If now, it be desired to depress the moving knife to shear the metal, the lever 48 is moved so as to disengage it from the lever 46, whereupon the auxiliary cylinder 32 and its piston being free to act project the piston-valve 28, which acting through the lever 46 retracts the other piston-valve 29. This establishes communication between the main cylinder 12 and the water supply, and forces down said cylinder as before explained, carrying with it the rod 44 and tappets 43, 43'. As the cylinder nears the end of its stroke, the tappet 43 engages the anti-friction roller 42, and moves the lever 40 laterally (to the right as shown in Fig. 3), and when the end of the stroke is reached, the lever has been moved far enough to operate the piston-valves 39, reversing their position so as to connect the cylinder 32' with the supply, and the cylinder 32 with the exhaust. The cylinder 32' then acts to project its piston and to reverse the piston-valves of the valve 27, thereby connecting the pipe 15 with the exhaust and permitting the counterbalancing cylinder to lift the shear-cylinder. When the cylinder comes to the end of its up-stroke, the tappet 43' engages the roller 42, and moves the lever 40 to its original position shown in Fig. 3; but if it be desired to stop the motion of the parts, the operator, before the end of the up-stroke has been reached, moves back the lever 48, so as to engage the lever 46, whereupon the cylinder 12, at the end of its stroke, comes to rest. When it is desired that the shear-cylinder should operate continuously, the lever 48 may be moved to the right to its full extent as shown by dotted lines in Fig. 3, in which position it is held by engagement of a locking spring 52 with a shoulder on the shear-frame. When said spring is released, its tension will throw the lever over to the left to the position indicated by full lines. By means of the mechanism above described, I secure the operation of the main valve of the shears (or any other hydraulic mechanism to which the invention may be applied) by means of motors which in turn are controlled and operated by auxiliary or pilot valves. This I accomplish by improved mechanism, which is certain in its action, is easy to keep in repair, and is strong and effective.

The facility afforded by my improvement for controlling the motion of the shears and the rapidity of action which it insures will be appreciated by those having occasion to use the same.

Within the scope of my invention, as stated in the claims of this application, many changes may be made in the form, relative arrangement, and construction of the parts of the apparatus; since

What I claim as new, and desire to secure by Letters Patent, is—

1. The combination with hydraulic mechanism, such as shears, of main piston-valves having oppositely acting pistons, mechanism connecting them and adapting them to move in unison, separate single acting motors having pistons which act on the main valve pistons, and auxiliary valve-mechanism connected with the motors and adapted to operate them alternately; substantially as described.

2. The combination with hydraulic mechanism, such as shears, of main piston-valves having oppositely acting pistons, mechanism connecting them and adapting them to move in unison, separate single-acting motors having pistons which act on the main valve pistons, and auxiliary valve-mechanism connected with the motors and adapted to operate them alternately, said auxiliary valve-mechanism being constructed and arranged to be operated by motion of the hydraulic-mechanism; substantially as described.

3. The combination with hydraulic mechanism such as shears, of a main valve or valves, a motor or motors for operating the same, auxiliary valve mechanism controlling the motor or motors, said auxiliary valve mechanism being constructed and arranged to be operated by motion of the hydraulic mechanism, and locking mechanism for the main valve or valves; substantially as and for the purposes described.

4. The combination with hydraulic mechanism, such as shears, of main piston-valves having oppositely acting pistons, mechanism connecting them and adapting them to move in unison, motors which act on the main valve pistons, auxiliary piston-valves which control the motors, and a lever which connects the pistons of the auxiliary valves and causes them to move together, said lever being operated by the hydraulic mechanism; substantially as described.

5. The combination with hydraulic mechanism such as shears, of main piston valves, motors acting thereon, auxiliary piston-valves controlling the motors, and a lever connecting the pistons of the main valves adapting them to move together; substantially as and for the purposes described.

6. The combination with hydraulic mechanism such as shears, of main piston valves, motors acting thereon, auxiliary piston valves controlling the motors, a lever connecting the pistons of the main valves, and a hand locking-lever, adapted to lock the main valves; substantially as and for the purposes described.

In testimony whereof I have hereunto set my hand this 15th day of April, A. D. 1892.

HENRY AIKEN.

Witnesses:
W. B. CORWIN,
H. M. CORWIN.